Figure 4:
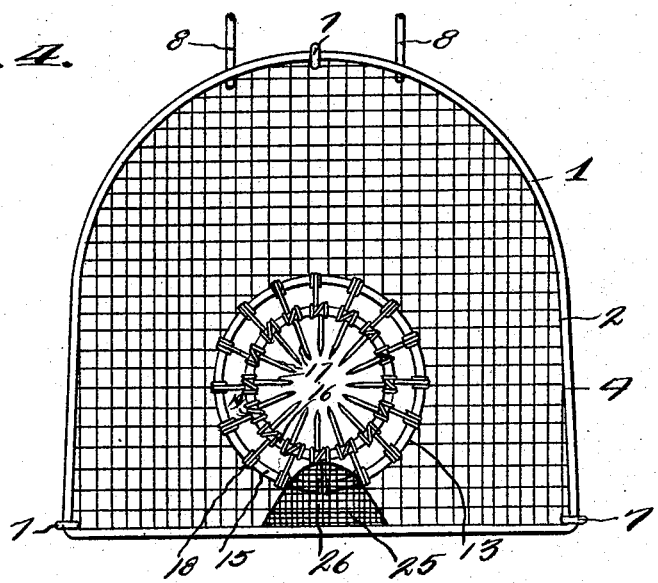

E. V. MARTIN.
RAT TRAP.
APPLICATION FILED FEB. 2, 1916.
1,187,359.
Patented June 13, 1916.
2 SHEETS—SHEET 1.
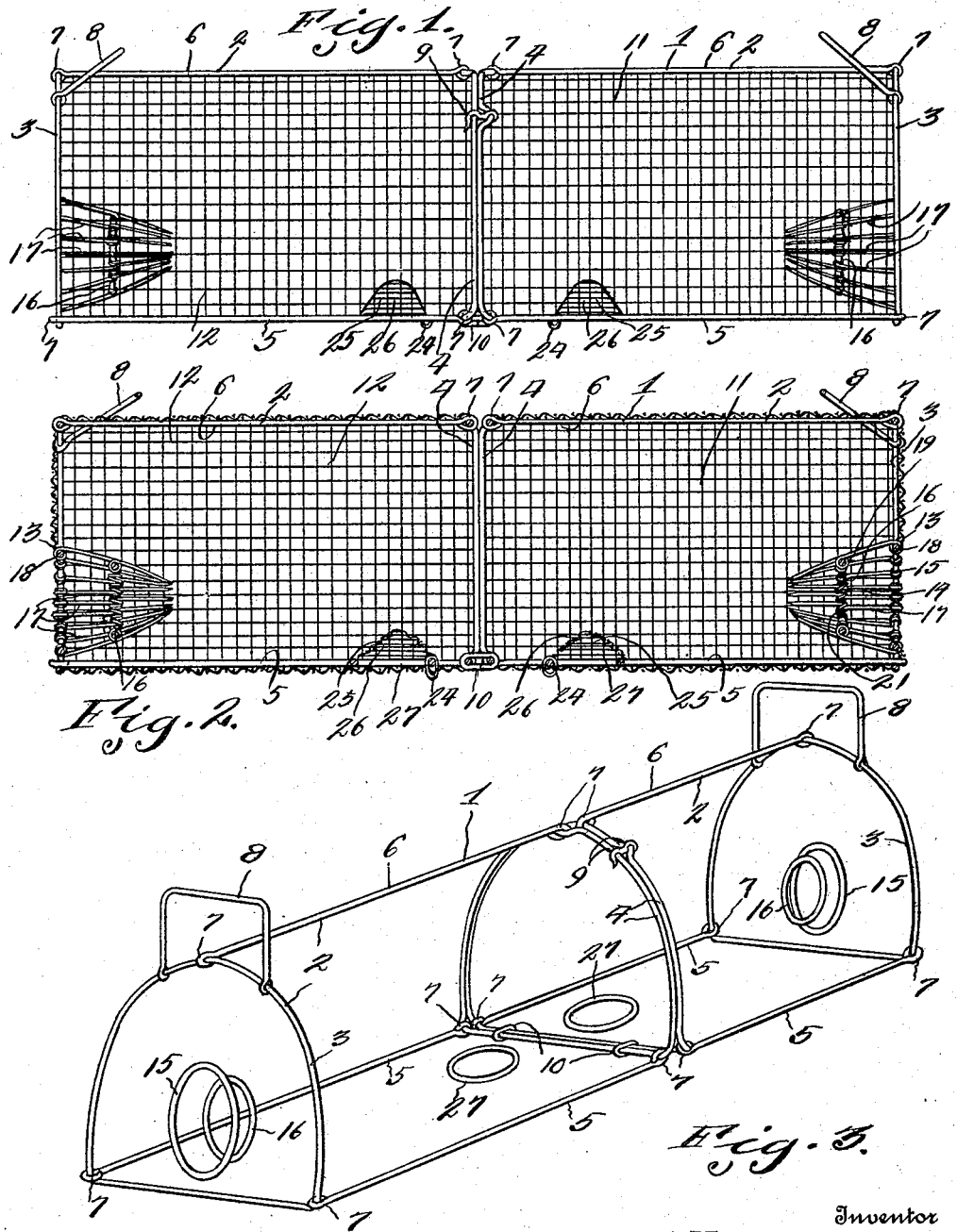

E. V. MARTIN.
RAT TRAP.
APPLICATION FILED FEB. 2, 1916.

1,187,359.

Patented June 13, 1916.
2 SHEETS—SHEET 2.

UNITED STATES PATENT OFFICE.

EARL V. MARTIN, OF CLEMONS, IOWA.

RAT-TRAP.

1,187,359.  Specification of Letters Patent.  Patented June 13, 1916.

Application filed February 2, 1916. Serial No. 75,694.

*To all whom it may concern:*

Be it known that I, EARL V. MARTIN, a citizen of the United States, residing at Clemons, in the county of Marshall, State of Iowa, have invented a new and useful Rat-Trap; and I do hereby declare the following to be a full, clear, and exact description of the invention, such as will enable others skilled in the art to which it appertains to make and use the same.

This invention relates to an improved rat trap, and an object of the invention is to provide an improved device of this nature having simple, efficient and practical features of construction.

One of the features of construction is the provision of a meshwork cage having at one end an opening passage consisting of annular rings, one smaller in diameter than the other, and arranged concentrically in elevation, one spaced apart from the other, and connected and held rigid by wire stays, which, owing to one ring being smaller in diameter than the other, form an opening passage which converges.

Another feature of the invention is that the free portions of the wire stays (which are tapering) converge toward the interior of the trap cage, thereby forming a restricted opening, through which the animal may pass, the free portions of said stays yielding incident to the said passage of the animal, but when the animal attempts to escape through the restricted opening, the pointed stays will prevent the same.

Another feature of the invention is the provision of means upon the annular rings to hold the stays substantially at equal intervals apart.

Another feature of the invention is the provision of a bait cage pivoted to the bottom of the trap cage.

In practical fields the details of construction may necessitate alterations, falling within the scope of what is claimed.

The invention comprises further features and combination of parts, as hereinafter set forth, shown in the drawings and claimed.

Figure 5:
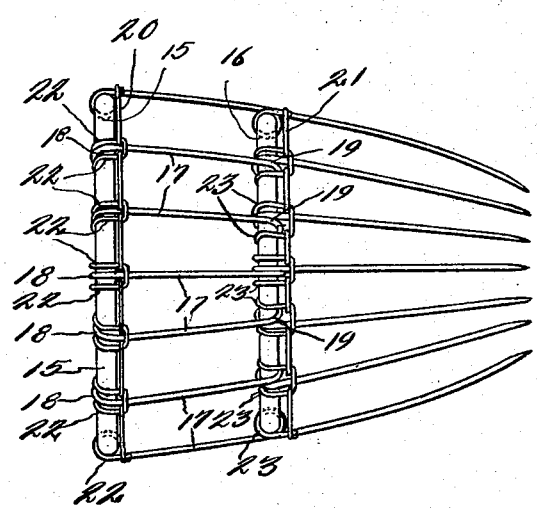

In the drawings: Figure 1 is a view in side elevation of the improved trap constructed in accordance with the invention. Fig. 2 is a longitudinal sectional view through the trap showing the two compartments. Fig. 3 is a perspective view showing the skeleton wire frame and the annular rings (which assist in forming the converging passages) at the ends of the cage. Fig. 4 is a view in end elevation of the animal or rat trap, clearly showing the converging passage opening for the animal. Fig. 5 is an enlarged detail view of the annular rings and the spaced tapering stays for forming the passage opening.

Referring more especially to the drawings, 1 designates, as a whole, the skeleton frame consisting of the two sections 2, each section comprises the end wire arch members 3 and 4, and the bottom side rods 5 and the top connecting rods 6. The opposite ends of the rods 5 and 6 are turned into eyes 7, which engage the wire arch members 3 and 4. The wire arch members 3 are provided with loop handles 8, whereby the animal trap may be lifted from place to place. It is to be noted that when forming a trap cage having two compartments, the two sections of the skeleton frame are linked together by the link loops 10, which engage the adjacent wire arch members 4.

Referring to the drawings, it will be seen that both sections of the skeleton frame are covered with meshwork 11 and 12, excepting the adjacent ends of said section, which adjacent ends are hinged together by the links 10, so that the two sections may be opened to allow the animal out of the trap, there being a hook 9 to hold the sections connected when the trap is set.

The meshwork of one end of each trap section is provided with an annular opening 13, to which the passage opening structure is fastened. Each passage opening comprises the annular rings 15 and 16. The ring 15 is secured in the opening 13, by the wires of the meshwork being wrapped around the ring 15 in any suitable manner, which is not deemed necessary to illustrate. This passage opening also consists of the wire stays 17. It is to be noted that the ring 16 is smaller in diameter than the ring 15, in which case the wire stays will be held in converged positions. The outer ends of the stays are provided with eyes 18, which engage the ring 15. Substantially the central portions of the stays 17 are provided with coils or eyes 19, which receive the ring 16. It is to be noted that securing or holding wires 20 and 21 are provided. The holding wire 20 extends annularly adjacent and concentrically with relation to the ring 15 and has a plurality of coils 22 (which are formed from the holding wire 20 by bending the same) arranged in pairs as shown, one of each pair being upon each side of the coil or eye 18, therefore owing to the coils or eyes 22 being so arranged and that the holding wire 20 extends annularly with relation to the ring 15, the wire stays 17 are held substantially at equal intervals apart upon the ring 15. The holding wire 21 is correspondingly constructed and arranged, therefore its eyes or coils 23 and the fact that the holding wire 21 is annular and concentric with and adjacent the ring 16, the central portions of the wire stays are held at equal intervals apart. After bending the holding wires 20 and 21 as aforesaid, to form the coils or eyes 22 and 23, and arranging said wires concentric with said rings 15 and 16 and connecting the respective ends of said wires, it is to be seen that said wires will be in the form of rings, which are concentric with and adjacent the rings 15 and 16. As before stated, the ring 16 is smaller in diameter than the ring 15, therefore the stays converge toward each other. Moreover, the stays inwardly beyond the ring 16 are additionally bent toward each other, thereby forming a converging or conical opening passage, through which the animal or rat may pass into the trap section, and owing to the extremities of the stays being sharp, and that the opening at the inner tapered sharp ends of the stays is restricted, the rat or animal is prevented from returning through the passage opening. However, the rat or animal in passing through the passage opening cause the free portions of the stays to yield. Fastened by a loop link 24 to the meshwork of the bottom of each trap section is a bait cage 25, consisting of the conical meshwork cage 26 and the annular ring 27, to which the conical cage is fastened, in any suitable manner. It is to be noted that the trap sections may be disconnected, and used individually. However, the adjacent ends of the trap sections may be provided with meshwork, and not hingedly connected, so that said sections may be used individually as traps.

The invention having been set forth, what is claimed as new and useful is:

1. In an animal trap, a trap cage having an entrance passage at either end, said passage comprising a pair of rings, one of which is secured in the meshwork of the end and being larger in diameter than the other, stays having coils engaging and connecting said rings, the stays being sharp or pointed and designed to yield as the animal enters and converging to form a contracted passage on the interior of the trap cage to prevent the escape of the animal, and wires arranged adjacent to and concentric with said rings and having eyes in pairs and engaging the rings, the eyes of each pair being upon opposite sides of the coils of the stays to hold the stays substantially at equal spaced intervals.

2. An animal trap cage, an entrance passage at one end of the cage comprising a pair of rings, one of which is secured to the wire fabric of the cage and larger in diameter than the other, stays having eyes engaging and connecting said rings, circular wire rings adjacent to and concentric with the first rings, each wire ring consisting of a single length of wire, which is bent and constructed to form a plurality of coils arranged in pairs, the coils of each pair being upon opposite sides of the eyes of the stays and receiving the first ring, thereby holding the stays substantially at equal spaced intervals, and preventing displacement of the stays relative to each other.

In testimony whereof I have signed my name to this specification in the presence of two subscribing witnesses.

EARL V. MARTIN.

Witnesses:
W. M. MOORE,
THEO. L. ARMSTRONG.

Copies of this patent may be obtained for five cents each, by addressing the "Commissioner of Patents, Washington, D. C."